United States Patent [19]

Jarvis

[11] Patent Number: 5,052,184
[45] Date of Patent: Oct. 1, 1991

[54] COOLER CHEST GRID AND METHODS

[76] Inventor: Paul L. Jarvis, 4014 Edgewood Dr., Cocoa, Fla. 32926

[21] Appl. No.: 619,516

[22] Filed: Nov. 29, 1990

[51] Int. Cl.⁵ .......................................... B65B 63/08
[52] U.S. Cl. ..................................... 62/60; 62/457.7; 62/459; 62/372; 62/465
[58] Field of Search .................. 62/457.1, 457.7, 457.4, 62/371, 372, 459, 464, 465, 60

[56] References Cited

U.S. PATENT DOCUMENTS

| | | | |
|---|---|---|---|
| 726,995 | 5/1903 | Heine | 62/459 |
| 2,663,157 | 2/1951 | Laramy | 62/441 |
| 3,106,074 | 10/1962 | Amburgey, Jr. | 62/464 |
| 4,424,687 | 1/1984 | Morgan | 62/457.7 |
| 4,577,475 | 3/1986 | Herrera | 62/457.7 |
| 4,813,243 | 3/1989 | Woods et al. | 62/457.7 X |
| 4,899,904 | 2/1990 | Dooley et al. | 62/457.7 X |
| 4,916,923 | 4/1990 | Adams et al. | 62/457.1 |

Primary Examiner—Albert J. Makay
Assistant Examiner—John Sollecito
Attorney, Agent, or Firm—Edward M. Livingston

[57] ABSTRACT

A screened grid (1) is sized and shaped to fit inside of a cooler chest (4). Doors (9) in the screened grid (1) are provided for accessing sealed beverage containers (2) storable under the screen grid (1) in ice water, which cool the sealed containers (2) under the grid (1) and also cool and keep dry or unsealed food items positionable above the screen grid (1). Cubed ice is poured or packed around and on top of the food items, such as wrapped sandwiches. This allows everything to stay cool but not wet because the ice water drops below the grid and cools the sealed beverages and/or sealed food containers stored below the grid. The grid (1) can be constructed of materials which can be pre-cooled to aid cooling effect with a cooler chest (4).

20 Claims, 1 Drawing Sheet

COOLER CHEST GRID AND METHODS

BACKGROUND OF THE INVENTION

This invention relates to cooler chests for keeping food and other items cool while being stored and carried before they are consumed. In particular, it relates to a means for keeping dry foods separate from the ice-water which collects at the bottom in a cooler chest, while utilizing the ice water to cool sealed beverages and other sealed containers.

Cooler chests currently do not have a convenient means for separating dry and unsealed food items from sealed containerized foods such as beverages. Sandwiches and cake, for instance, often get wet from melted ice in cooler chests and from condensation of water on pre-cooled cans of beverages. This is a common hazard of using cooler chests for picnicking and carrying food while traveling in vehicles.

Prior-art partitioning of cooler chests have included such devices as described in U.S. Pat. No. 2,663,157 granted to R. C. Laramy on Dec. 22, 1953. The Laramy device provided a storage space for ice and water but not beverages or containerized foods beneath a platform on a floor of a cooler chest. U.S. Pat. No. 4,424,687 granted to Marshall M. Morgan on Jan. 10, 1984 described a rack or platform standing above the bottom of an ice chest but did not provide a means for accessing containerized food in water and ice stored beneath the platform without removing the platform and food stored above it. U.S. Pat. No. 4,577,475 was for a completely different type cooler chest with a drawer-type beverage container below a top section for other food items. U.S. Pat. No. 3,106,074 taught a cooler chest with a door to a bottom section. U.S. Pat. No. 4,813,243 provided for rotating beverage cans in ice for a quick-chill effect. U.S. Pat. No. 4,899,904 described an inclined plane with a trap door at the bottom for removing cylindrical beverage containers from a specially constructed cooler chest. U.S. Pat. No. 4,916,923 employed a device for separating upstanding beverage containers at opposite walls of a cooler chest to provide storage space in water and ice between them.

Contrary to the aforementioned prior art, the present invention provides a grid for separating dry food from ice-water cooled items in a cooler chest that also allows easy access to the ice-water cooled items by doors or other means. The present invention may be installed as part of a cooler chest during manufacture or as an aftermarket modification.

SUMMARY OF THE INVENTION

One object of this invention is to provide standard, simple cooler chests, commonly constructed of foamed insulation material, with a convenient, low-cost and efficient means for separating dry or unsealed foods from ice-water at the bottom of the cooler chests.

Another object is to maximize cooling effects of ice and water for cooling containerized beverages.

Another object is to provide easy access to sealed containers that are separated from dry or unsealed foods in cooler chests.

A further object is to enhance cooling effectiveness of ice and water with pre-cooled materials from which the invention is constructed.

The present invention accomplishes the above and other objects by providing a screened grid sized and shaped to fit inside of a cooler chest. Access orifices and flexibility of the screen at right angles to rigid members of the screen are provided for accessing sealed containers stored under the screen in water and ice which cool the sealed containers under the grid and under dry or unsealed food items above the screen grid. The grid can be constructed of materials which can be pre-cooled to aid cooling effect within a cooler chest.

BRIEF DESCRIPTION OF THE DRAWINGS

This invention is described in appended claims in relation to a description of a preferred embodiment and the following drawings in which:

DESCRIPTION OF THE PREFERRED EMBODIMENTS

Figure 1:
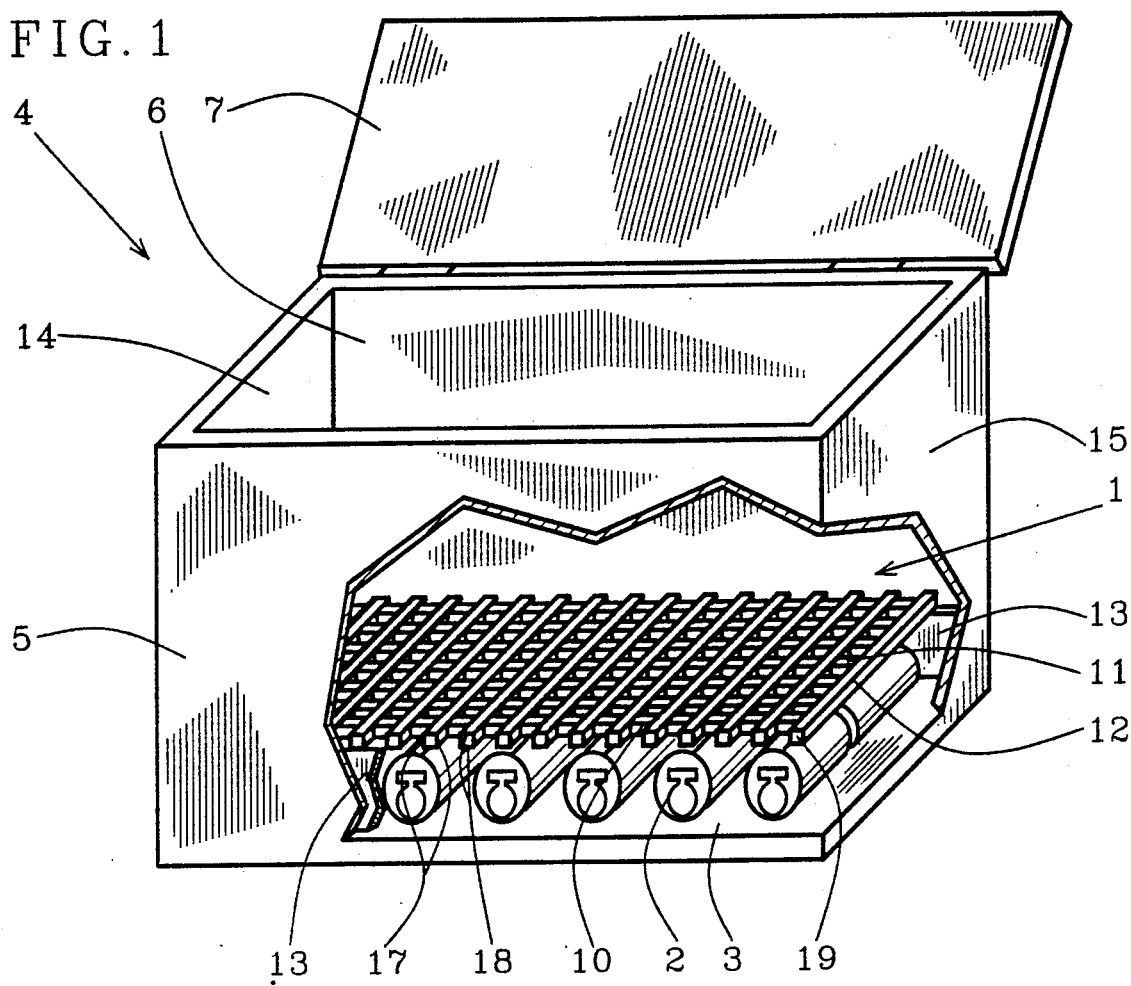
FIG. 1 is a perspective cutaway view of a screen grid in a cooler chest with containerized beverages stored under it.

Referring to FIG. 1, a cooler-chest grid 1 is positionable above beverage items stored in sealed containers 2 on a chest floor 3 of a cooler chest 4 having front wall 5, rear wall 6 and top 7. Dry or unsealed food items can be stored above the grid 1 and ice-water can cover the sealed containers 2 beneath the grid.

Figure 2:
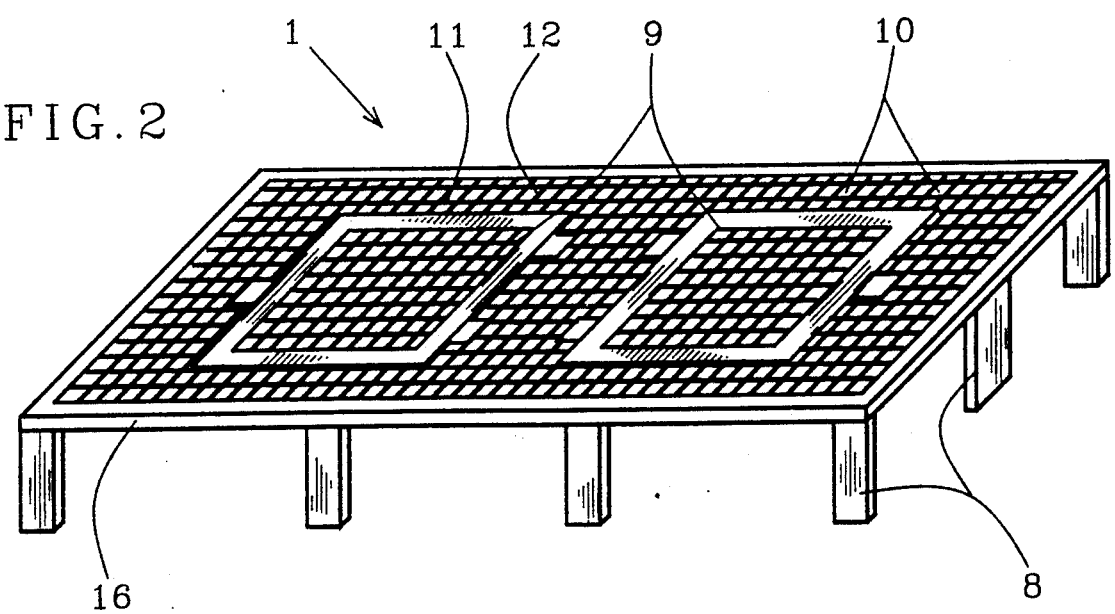
FIG. 2 is a screen grid separate from a cooler chest and having legs to keep it above beverage containers stored in ice-water under it and access doors to beverage items under the grid without removal of all food stored above the grid.

Referring to FIG. 2, the grid 1 can have legs 8 to keep it above beverages and ice-water from melted ice under the grid 1. The grid 1 with legs 8 attached can be used also as a service table when removed from the chest 4.

Referring further to FIG. 2, access doors 9 can be provided to access beverages and other food items stored under the grid 1 without removal of all food items stored above it. The access doors 9 can be sized and shaped for entry and exit of standard beverage containers in order to minimize the amount of food required to be moved for opening access doors 9.

Referring now to FIGS. 1 and 2, circulation orifices 10 are provided for circulation of air between cooling media below the top of the grid 1 and food or other items stored above the grid 1.

The grid can be provided with flexible members 11 which are joined at right angles to rigid members 12. This embodiment of the invention imparts flexibility to allow lifting of an end or ends of the grid for access under it while the rigid members 12 are supported on support members 13 at right angles to optional flexibility of grid 1. The support members 13 can be either separate from, attachable to or built into walls 5 and 6 of the cooler chest 4. Alternatively, the rigid members 12 can be extended between the side walls 14 and 15 when flexible members 11 are at right angles to the illustration in FIG. 1.

The grid 1 can be constructed of relatively thick screen members 11 and 12 which can be pre-cooled below water-freezing temperature in order to provide cooling effect with or without ice under the screen. Ice in addition to pre-cooling of the grid 1 would be preferable because it provides water and water vapor for enhancing transfer of low temperature to items stored both below and above the grid 1. Construction with relatively thick screen members 11 and 12 is illustrated in FIG. 1.

The rigid members 12 in the FIG. 1 embodiment can have perpendicular rigid side walls 17, flexible top and bottom walls 18 and sealed end walls 19. The flexible members 11 can have flexible walls at all surfaces. Screen grid members 11 and 12 can be hollow and sealed to contain liquid or granular material which can be pre-cooled for added cooling effect. Alternatively, the screen grid members 11 and 12 can be constructed of relatively thick material which can be pre-cooled for aiding cooling effects.

The grid 1 can be constructed also of relatively thin or wire-like members 11 and 12 attached to a frame 16 as illustrated in FIG. 2. Optionally, the grid 1 could be made of telescoping members or similar such that the same grid could be used to fit various sizes of coolers.

All modifications, adaptations, alterations and applications of this invention that are foreseeable within the following descriptive claims are included in this invention.

Having thus described my invention, I claim:

1. A cooler-chest grid comprised of:
   a screened grid with outside edges sized and shaped to fit horizontally within the interior walls of a cooler chest;
   circulation orifices in communication between a bottom surface and a top surface of the screened grid, said orifices being sized and shaped to allow convective heat transfer within the cooler chest from a relatively low-temperature cooling substance to food items positioned above a top surface of the screen and to allow liquid from the cooling substance to drain through the grid to keep said food items dry; and
   a plurality of access means located in the screen grid for accessing beverages and cooled food items beneath the screen.

2. A cooler-chest grid according to claim 1 wherein the plurality of access means comprise screened doors in the screened grid.

3. A cooler-chest grid according to claim 2 wherein said screened doors are upwardly-hinged.

4. A cooler-chest grid according to claim 3 and further comprising:
   legs on the bottom of the screen grid sized and shaped to support the screened grid selectively above food or beverage items in sealed containers positionable below the grid.

5. A cooler-chest grid according to claim 2 wherein the doors are sized and shaped for passage of select beverage containers.

6. A cooler-chest grid according to claim 3 wherein the upwardly-hinged screened doors are sized and shaped for passage of select beverage containers.

7. A cooler-chest grid according to claim 4 wherein the upwardly-hinged screened doors are sized and shaped for passage of select beverage containers.

8. A cooler-chest grid according to claim 1 wherein the screened grid contains material which allows convective transfer from the cooling substance to items in the cooler chest.

9. A cooler-chest grid according to claim 2 wherein the screened grid contains material which allows convective transfer from the cooling substance to items in the cooler chest.

10. A cooler-chest grid according to claim 3 wherein the screened grid contains material which allows convective transfer from the cooling substance to items in the cooler chest.

11. A cooler-chest grid according to claim 4 wherein the screened grid contains material which allows convective transfer from the cooling substance to items in the cooler chest.

12. A cooler-chest grid according to claim 5 wherein the screened grid contains material which allows convective transfer from the cooling substance to items in the cooler chest.

13. A cooler-chest grid according to claim 1 wherein the access means is comprised of flexible of screen members at right angles to rigid members of the screen such that the screen can be bent upwards at either of two opposite edges for access to items beneath the screen.

14. A cooler-chest grid according to claim 13 and further comprising:
   a support member positionable at opposite sides of the cooler chest beneath opposite ends of the rigid members of the screen.

15. A cooler-chest grid according to claim 8 wherein the access means is comprised of flexible of screened grid members at right angles to rigid members of the screened grid such that the screened grid can be bent upwards at either of two opposite edges for access to items beneath the screened grid.

16. A cooler-chest grid according to claim 15 and further comprising:
   support members positionable at opposite sides of the cooler chest beneath opposite ends of the rigid members of the screened grid.

17. A cooler-chest grid according to claim 15 and further comprising:
   rigid perpendicular side walls of the rigid members;
   flexible top and bottom walls of the rigid members;
   enclosed ends of the rigid members;
   flexible members comprised of enclosures having flexible walls; and
   low-temperature storage material inside of enclosures formed by grid members.

18. A cooler-chest grid according to claim 15 wherein the screen members are constructed of heat-storage material which can be pre-cooled to aid in cooling contents of the cooler chest.

19. A method for using a cooler-chest grid comprised of:
   a screened grid with outside edges sized and shaped to fit horizontally within interior walls of a cooler chest;
   orifices in communication between a bottom surface and a top surface of the screened grid, said orifices being sized and shaped to allow convective heat transfer within the cooler chest from a relatively low-temperature cooling substance to food items positioned above a top surface of the screened grid and to allow liquid from the cooling substance to drain through the grid to keep said food items dry; and
   a plurality of access doors located in the screen grid for accessing food or beverages beneath the screened grid, said method comprising the following steps:
   placing optional containerized beverages on the bottom inside surface of the cooler chest;
   placing the cooler-chest grid over the optionally containerized beverages;
   placing select non-containerized and dry food items above the cooler chest grid;

removing for select utilization the non-containerized and dry food items which will be free of water from melted ice under the grid; and removing for select utilization the containerized beverages through the access doors.

20. A method according to claim 19 wherein the cooler-chest grid contains material which has convective heat transfer qualities for transfer of same to items in the cooler chest and wherein the method includes an additional preliminary step of pre-cooling the cooler-chest grid.

* * * * *